United States Patent
Gao et al.

(10) Patent No.: US 10,155,542 B2
(45) Date of Patent: Dec. 18, 2018

(54) STEPPED HONEYCOMB ROCKER INSERT

(71) Applicant: Ford Global Technologies, LLC, Dearborn, MI (US)

(72) Inventors: Zhenyan Gao, Northville, MI (US); Shaikh Akhlaque-e-rasul, Windsor (CA); Cheng Luo, Dearborn Heights, MI (US); William Moore Sherwood, Royal Oak, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 204 days.

(21) Appl. No.: 15/004,326

(22) Filed: Jan. 22, 2016

(65) Prior Publication Data
US 2017/0210426 A1 Jul. 27, 2017

(51) Int. Cl.
*B62D 21/15* (2006.01)
*B62D 25/02* (2006.01)
*B62D 29/00* (2006.01)

(52) U.S. Cl.
CPC .......... *B62D 21/157* (2013.01); *B62D 25/025* (2013.01); *B62D 29/008* (2013.01)

(58) Field of Classification Search
CPC ............................ B62D 21/157; B62D 25/025
USPC .................................................. 296/187.03
See application file for complete search history.

(56) References Cited

U.S. PATENT DOCUMENTS

| | | | | |
|---|---|---|---|---|
| 4,152,012 A | * | 5/1979 | Reidelbach | B62D 21/152 280/784 |
| 4,221,413 A | * | 9/1980 | Bonnetain | B60R 19/18 188/377 |
| 4,352,484 A | * | 10/1982 | Gertz | E01F 15/146 256/13.1 |
| 4,475,624 A | * | 10/1984 | Bourland, Jr. | E04C 2/365 181/213 |
| 5,480,729 A | | 1/1996 | Hattori et al. | |
| 5,620,276 A | * | 4/1997 | Niemerski | E01F 15/145 256/1 |
| 6,004,066 A | * | 12/1999 | Niemerski | E01F 15/145 188/377 |

(Continued)

FOREIGN PATENT DOCUMENTS

| | | | | |
|---|---|---|---|---|
| DE | 2421233 A1 | * | 11/1975 | ........... B62D 21/152 |
| DE | 19716223 | | 11/1998 | |

(Continued)

*Primary Examiner* — Hilary L Gutman
(74) *Attorney, Agent, or Firm* — Jason Rogers; Brooks Kushman P.C.

(57) ABSTRACT

A rocker assembly, or an elongated beam, for a vehicle that includes an outer panel, a side sill and an insert disposed in a cavity. The insert includes a plurality of layers of reinforcements made up of hexagonal cells having interconnected walls defining a plurality of transversely extending open cells that define openings extending perpendicularly relative to the length of the rocker assembly. The plurality of layers of reinforcements may further comprise a first layer of cells assembled to the outer panel, a second layer of cells assembled to the side sill and a third layer of cells disposed between the first and second layers of cells. A wall thickness and bending strength of one of the plurality of layers of reinforcements is different than a wall thickness and bending strength of another of the plurality of layers of reinforcements. The insert is structured to deform progressively.

8 Claims, 5 Drawing Sheets

(56) References Cited

U.S. PATENT DOCUMENTS

| | | |
|---|---|---|
| 6,193,306 B1 | 2/2001 | Lee |
| 6,354,656 B1 | 3/2002 | Hwang |
| 6,406,088 B1* | 6/2002 | Tate .................... B62D 21/152 |
| | | 188/371 |
| 6,409,257 B1 | 6/2002 | Takashima et al. |
| 7,226,120 B2 | 6/2007 | Yamazaki |
| 7,347,486 B2 | 3/2008 | Uchida et al. |
| 7,594,691 B2 | 9/2009 | Koormann et al. |
| 7,884,704 B2 | 2/2011 | Iwano et al. |
| 8,322,780 B2 | 12/2012 | Nagwanshi et al. |
| 8,469,417 B2* | 6/2013 | Di Modugno .......... B60R 19/34 |
| | | 293/133 |
| 8,579,362 B2* | 11/2013 | Di Modugno .......... B60R 19/34 |
| | | 293/133 |
| 8,696,051 B2 | 4/2014 | Charbonneau et al. |
| 8,864,216 B2* | 10/2014 | Nagwanshi ............. B62D 29/004 |
| | | 296/187.01 |
| 9,033,404 B2 | 5/2015 | Meaige et al. |
| 9,771,109 B2* | 9/2017 | Nagwanshi ............. B60R 19/03 |
| 9,981,699 B2* | 5/2018 | Ayuzawa ............... B62D 21/157 |
| 10,029,734 B2* | 7/2018 | Akhlaque-e-rasul ...................... |
| | | B62D 21/157 |
| 2003/0030290 A1* | 2/2003 | Yamagiwa ............... B62J 23/00 |
| | | 293/105 |
| 2003/0090127 A1* | 5/2003 | Saeki .................... B62D 21/152 |
| | | 296/187.12 |
| 2011/0193369 A1* | 8/2011 | Wuest ..................... B60R 19/34 |
| | | 296/187.03 |
| 2012/0025547 A1* | 2/2012 | Haneda ................... B60R 19/34 |
| | | 293/133 |
| 2012/0086238 A1 | 4/2012 | Tan |
| 2012/0103714 A1 | 5/2012 | Choi et al. |
| 2013/0127191 A1* | 5/2013 | Zannier ................... B60R 19/03 |
| | | 293/133 |
| 2013/0154307 A1* | 6/2013 | Tamada ................... B60R 21/04 |
| | | 296/187.05 |
| 2013/0193699 A1* | 8/2013 | Zannier ................... B60R 19/34 |
| | | 293/133 |
| 2017/0015361 A1 | 1/2017 | Koch et al. |
| 2017/0210427 A1* | 7/2017 | Akhlaque-e-rasul ...................... |
| | | B62D 27/026 |
| 2018/0057060 A1* | 3/2018 | Tyan ....................... B62D 21/15 |
| 2018/0065677 A1* | 3/2018 | Tutzer .................... B62D 21/03 |
| 2018/0065678 A1* | 3/2018 | Tutzer .................... B62D 21/03 |

FOREIGN PATENT DOCUMENTS

| | | |
|---|---|---|
| DE | 102010030535 A1 | 11/2011 |
| EP | 2014539 A1 | 1/2009 |
| JP | S6418784 A | 1/1989 |

* cited by examiner

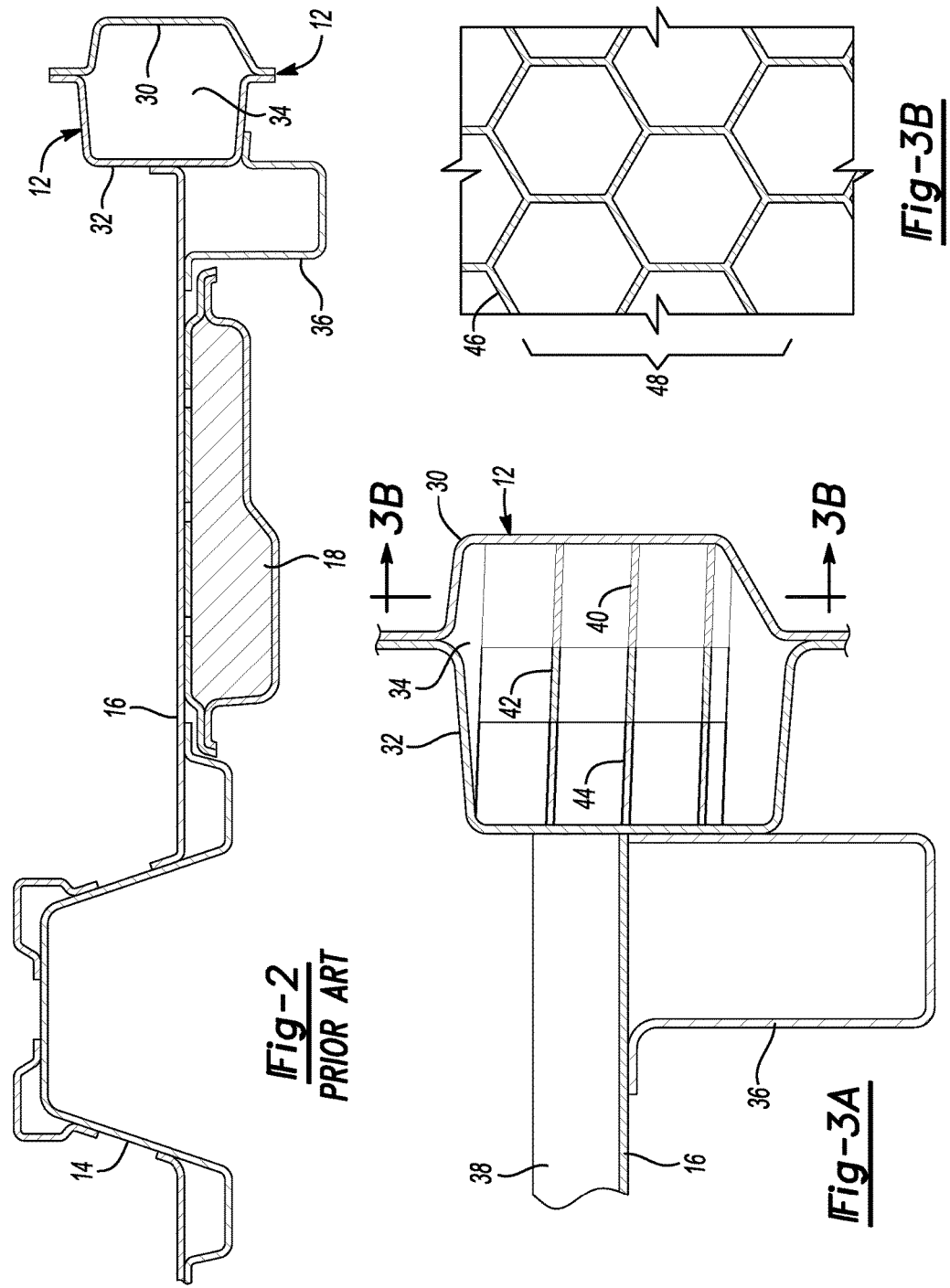

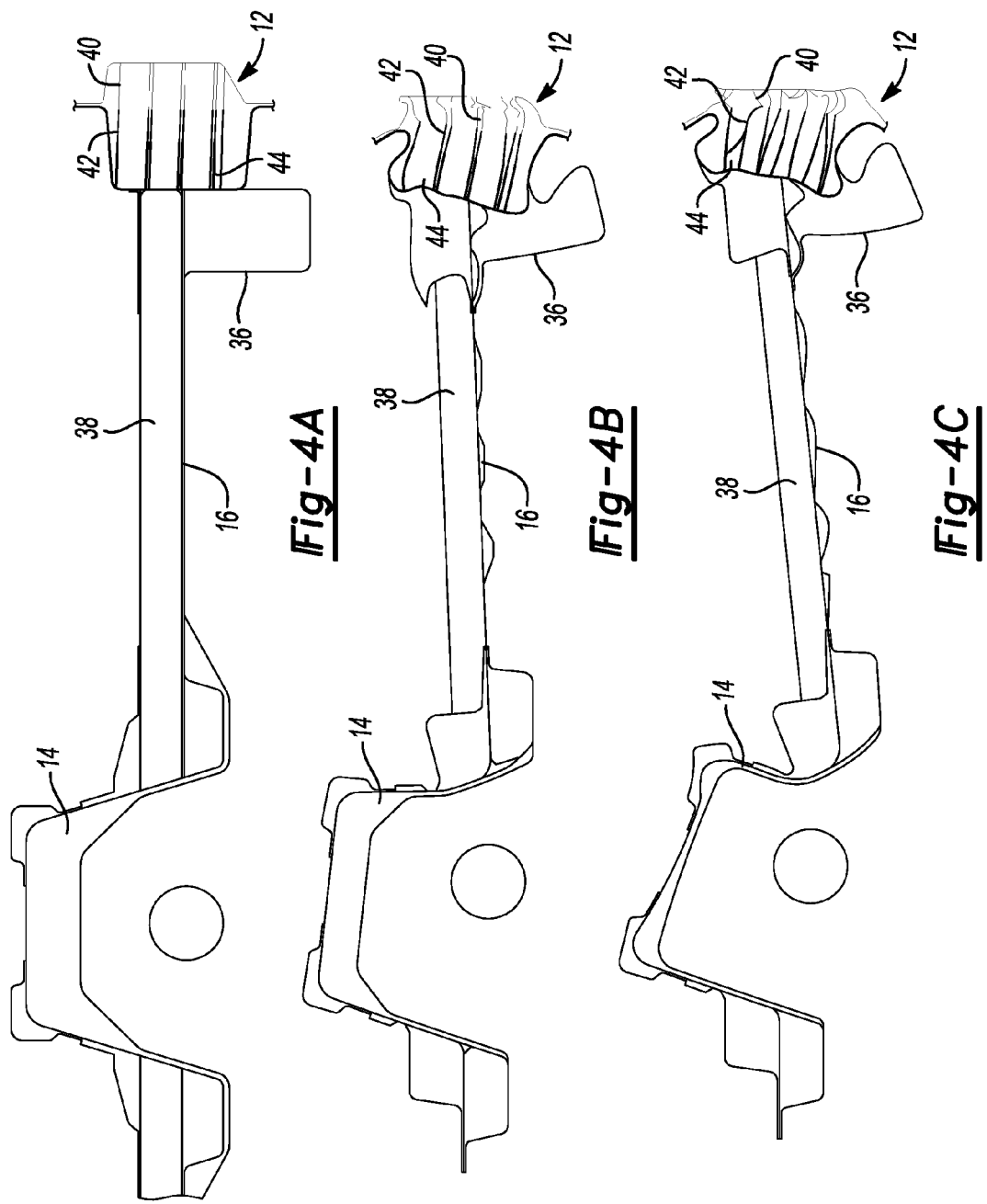

STEPPED HONEYCOMB ROCKER INSERT

TECHNICAL FIELD

This disclosure relates to a rocker assembly for a vehicle including an insert having a stepped honeycomb structure that reduces the extent of intrusion toward a battery pack and reduces acceleration of the battery pack in a side pole impact.

BACKGROUND

Rocker assemblies are provided between the front and rear wheel wells and below the doors of a vehicle to provide resistance to intrusion into the passenger compartment in side impact collisions. Rocker assemblies may include an outer rocker panel that is joined to a side sill. Various internal reinforcements have been proposed to strengthen rocker assemblies.

Electric vehicles may be provided with an underfloor mounted battery that powers an electric traction motor. Batteries for a hybrid electric vehicle may be attached between a central tunnel and the rocker assembly on both sides of the vehicle. Space is provided around the underfloor battery pack to reduce the potential for plastic deformation of the battery pack. If the rocker assembly is too soft it may provide inadequate protection from intrusion in side impact collisions.

Batteries for hybrid electric vehicles may be damaged by an impact. The battery pack may be damaged in a collision if the impact causes an acceleration spike in particular if the acceleration spike is of longer duration. If the rocker assembly is too rigid, acceleration of the battery pack caused by a side impact may create a longer spike of substantial duration and may cause damage to internal battery connections.

This disclosure is directed to solving the above problems and other problems as summarized below.

SUMMARY

According to one aspect of this disclosure, a beam is disclosed that includes a first panel and a second panel that defines a cavity in conjunction with the first panel. An insert is assembled within the cavity that has an outer portion adjacent the first panel with a bending stiffness $S_1$. The insert also has an inner portion with a bending stiffness $S_2$ that is more than $S_1$, wherein the beam collapses progressively in response to an impact to the first panel wherein the outer portion collapses preferentially relative to the inner portion.

According to another aspect of this disclosure, the first panel may be an outer rocker panel and the second panel may be a side sill panel.

The outer portion of the insert may be a first cellular network including a first plurality of cells connected together to form a first planar body and the inner portion of the insert may be a second cellular network including a second plurality of cells connected together to form a second planar body. The first and second plurality of cells may be hexagonal cells formed by interconnected shared cell walls that define openings extending perpendicularly relative to the length of the beam.

The outer portion of the insert may be a first plate formed by a first plurality of interconnected hexagonal cells and the inner portion of the insert may be a second plate formed by a second plurality of interconnected hexagonal cells. The first and second plates may be formed from aluminum.

The insert may further comprise an intermediate portion with a bending stiffness $S_3$ that is less than $S_2$ and greater than $S_1$ and wherein the intermediate portion is disposed between the outer portion and the inner portion.

According to another aspect of this disclosure, a rocker assembly is provided for a vehicle that comprises an outer panel, a side sill and an insert disposed in a cavity. The insert includes a plurality of layers of reinforcements having interconnected walls defining a plurality of transversely extending open cells. A wall thickness of one of the plurality of layers of reinforcements is different than a wall thickness of another of the plurality of layers of reinforcements.

The open cells are hexagonal and the plurality of transversely extending open cells may be formed by interconnected shared cell walls that define openings extending perpendicularly relative to the length of the rocker assembly.

The plurality of layers of reinforcements may further comprise a first layer of cells, a second layer of cells and a third layer of cells, wherein the first layer of cells is assembled to the outer panel, the second layer of cells is assembled to the side sill, and the third layer of cells is disposed between the first and second layers of cells. The second layer of cells has a wall thickness that is more than the wall thickness of the third layer of cells. The third layer of cells may have a wall thickness that is more than the first layer of cells.

The plurality of layers of reinforcements may further comprise a first layer of cells and a second layer of cells, wherein the first layer of cells is assembled to the outer panel and the second layer of cells is assembled to the side sill, wherein the second layer of cells has a wall thickness that is more than the wall thickness of the first layer of cells.

According to another aspect of this disclosure, a rocker assembly is disclosed for a vehicle that comprises an outer panel and a side sill defining a cavity with the outer panel. An insert assembled inside the cavity includes a first layer formed by a first plurality of open cells defined by a first plurality of walls having a first wall thickness, and a second layer formed by a second plurality of open cells defined by a second plurality of walls having a second wall thickness that is different than the first wall thickness.

The first and second plurality of open cells may be comprised of interconnected hexagonal shaped cells.

The first plurality of open cells may be assembled to the outer panel and the second plurality of open cells may be assembled to the side sill, wherein the second plurality of open cells has a wall thickness that is more than the wall thickness of the first plurality of open cells.

The first plurality of open cells may be assembled to the outer panel, the second plurality of open cells may be assembled to the side sill, and a third plurality of open cells may be disposed between the first plurality of open cells and the second plurality of open cells. The second plurality of open cells may have a wall thickness that is more than the wall thickness of the third plurality of open cells and the third plurality of open cells may have a wall thickness that is more than the wall thickness of the first plurality of open cells.

The first and second plurality of open cells may be formed by interconnected shared cell walls that define openings extending perpendicularly relative to the length of the rocker assembly.

The above aspects and other aspects of this disclosure are described in greater detail below with reference to the attached drawings.

BRIEF DESCRIPTION OF THE DRAWINGS

FIG. 2 is a fragmentary transverse cross-section view taken along the line 2-2 in FIG. 1 of a prior art vehicle having a conventional rocker assembly.

FIG. 3A is a fragmentary transverse cross-section view of a vehicle having a rocker assembly with an insert including a plurality of layers of interconnected cells disposed in the rocker assembly.

FIG. 3B is a fragmentary cross-section view taken along the line 3B-3B in FIG. 3A.

FIGS. 4A-4C illustrate a computer simulation of a side impact of the vehicle prior to impact (0 ms), at an intermediate point during the impact event (30 ms) and at the maximum intrusion of the impact event (50 ms).

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
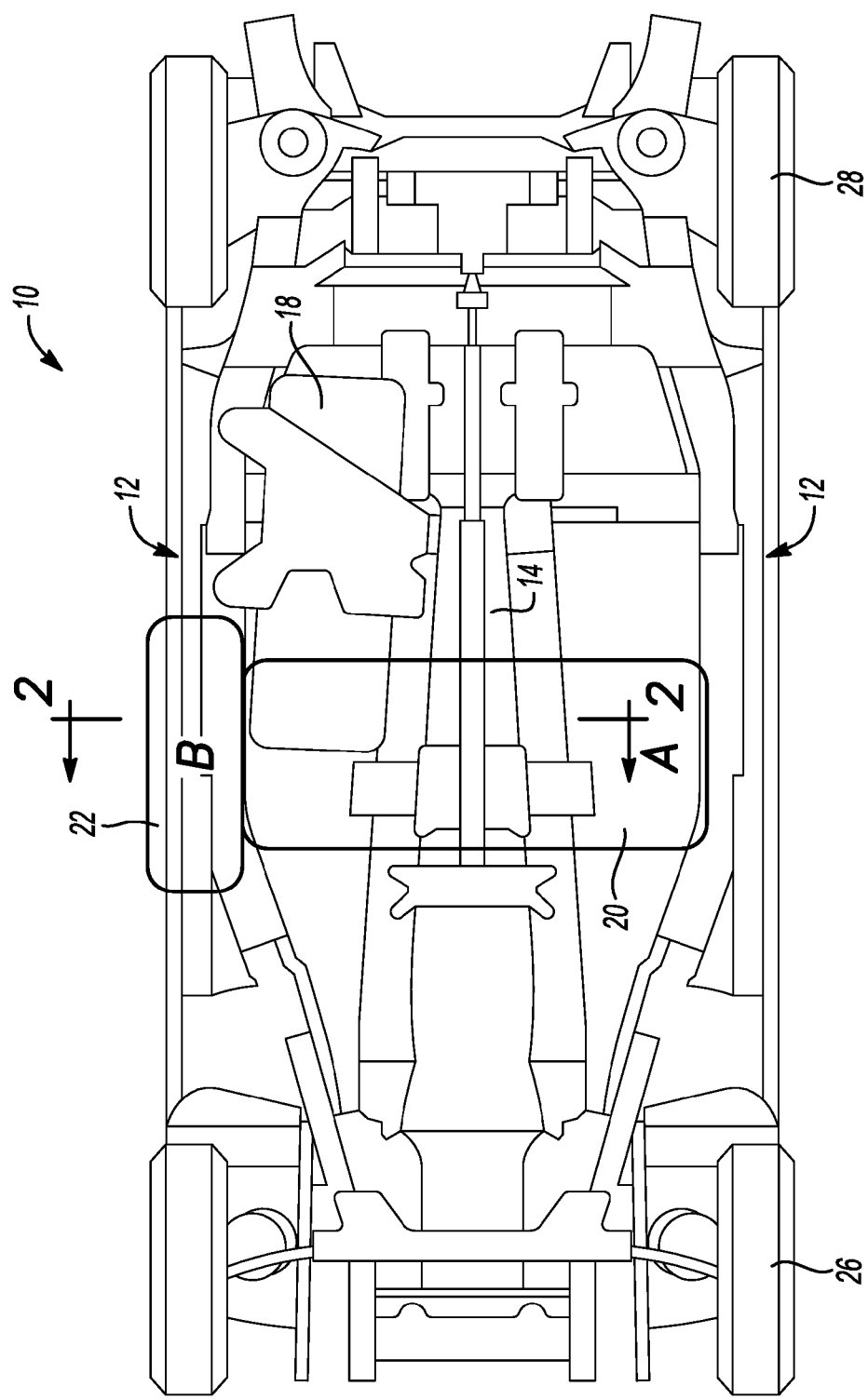
FIG. 1 is a diagrammatic bottom plan view of a prior art vehicle including a battery pack attached to the vehicle between the rocker assemblies and below the floor of the passenger compartment.

Referring to FIG. 1, the underbody of a vehicle 10 is illustrated. A rocker assembly 12, also referred to as an elongated beam, on right and left sides of the vehicle 10. A central tunnel 14 extends longitudinally between the rocker assemblies 12 and forms part of the floor pan 16 of the vehicle 10. The floor pan 16 underlies the passenger compartment of the vehicle 10 and is illustrated with an underfloor battery 18 attached below the floor pan 16 by brackets provided by the underbody structure. A protected area box 20 is labelled with the letter "A" and an impact absorbing area box 22 is labelled with the letter "B". The vehicle 10 has a pair of front wheels 26 and a pair of rear wheels 28. The rocker assembly 12 extends between the wheel wells of the front wheels 26 and rear wheels 28. FIG. 1 is identified as a prior art, but it should be understood that the vehicle depicted in FIG. 1 may include the rocker insert formed by connected hexagonal cells that are not visible because they are disposed within the rocker assembly 12.

Referring to FIG. 2, a prior art vehicle structure is shown to include a rocker assembly 12 on one side of the floor pan 16 and central tunnel 14. The rocker assembly 12 includes a rocker outer 30 and a side sill 32 that are assembled together to define the cavity 34. The underfloor battery 18 is shown secured to the floor pan 16 inboard of a sled runner beam 36 and the rocker assembly 12.

Referring to FIG. 3A, a rocker assembly 12 is shown that defines a cavity 34. The rocker assembly 12 includes an outer rocker panel 30 and the side sill 32 of the prior art or baseline rocker assembly 12 shown in FIG. 2. A cross member 38 is illustrated that is disposed above the floor pan 16 and the sled runner beam 36.

Inside the cavity 34, an outer portion 40 is shown attached to the rocker outer 30. The outer portion may be a plate of hexagonal cells or "honeycomb" plate. An intermediate portion 42 (or plate of hexagonal cells) is shown disposed between the outer portion 40 and an inner portion 44 (or plate of hexagonal cells).

In one example, the outer portion 40 may have a wall thickness of 0.4 mm. The intermediate portion 42 may have a wall thickness of 0.5 mm and the inner portion 44 may have a wall thickness of 0.6 mm. The outer portion 40 may have a bending stiffness $S_1$. The inner portion 44 may have a bending stiffness $S_2$, while the intermediate portion 42 may have a bending stiffness of $S_3$. The bending stiffness $S_1$ is less than bending stiffness $S_2$ and bending stiffness $S_3$ is less than bending stiffness $S_2$. The stepped arrangement of the honeycomb insert portions is intended to provide progressive deformation of the insert with the outer portion 40 being more readily deformed than the intermediate portion 42 that is, in turn, more readily deformed than the inner portion 44. While the beam as described is a rocker assembly, it should be understood that other elongated beams may be reinforced with an insert made according to this disclosure to provide for progressive deformation.

Referring to FIG. 3B, a plurality of hexagonal cells 46 taken through the outer portion 40 is illustrated that are generated about a central axis that extends in a transverse vehicle direction. The hexagonal cells 46 have shared cell walls that form a cellular network 48. The intermediate and inner portions 42 and 44 may have the same structure as the outer portion 40 with hexagonal cells 46 forming a cellular network 48 in each of the other portions.

Referring to FIGS. 4A-4C, deformation of the underbody of the vehicle is illustrated at 0 mm, 30 mm and 50 mm in FIGS. 4A, 4B, and 4C, respectively. At 0 mm before the beginning of a side impact collision event, the rocker assembly 12 is shown attached to the side of the vehicle (shown in FIG. 1) adjacent the cross member 38 and sled runner beam 36. The floor pan 16 is disposed below the cross member 38.

Referring to FIG. 4B at 30 mm, deformation of the outer rocker panel is deformed and a second, or intermediate, part of the honeycomb begins to compress after the initial compression of the outer portion 40. Energy is absorbed by the honeycomb as it progressively deforms.

Referring to FIG. 4C at 50 mm after impact, the inner honeycomb and sled runner are partially deformed and the outer portion 40 and intermediate portion 42 are completely deformed. At this point, the floor pan begins to wrinkle, but there is little or no buckling of the cross member 38.

Figure 5A:
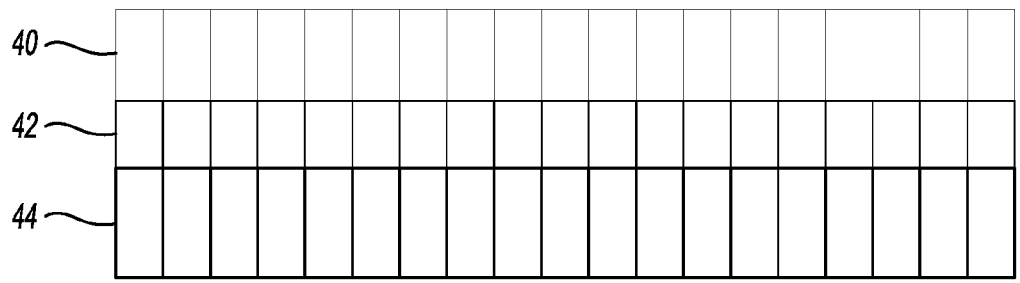
FIGS. 5A-5C illustrate a computer simulation of a side impact applied to the three layers of interconnected hexagonal cellular arrays prior to impact (0 ms), at an intermediate point during the impact event (30 ms) and at the maximum intrusion of the impact event (50 ms).
Figure 5B:
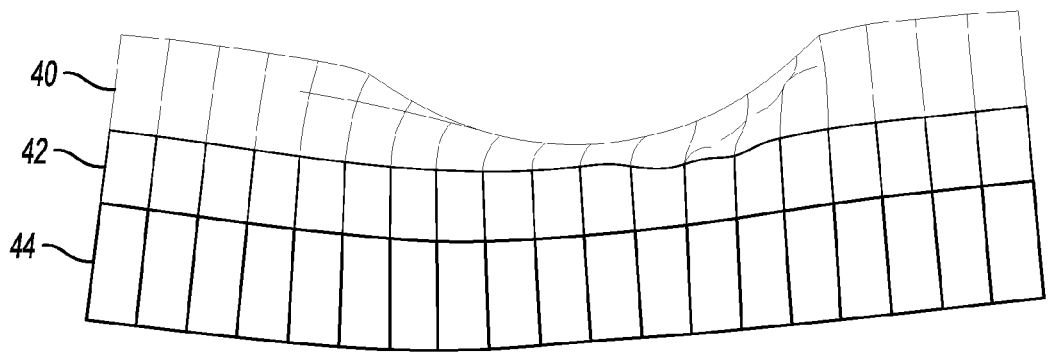
Figure 5C:
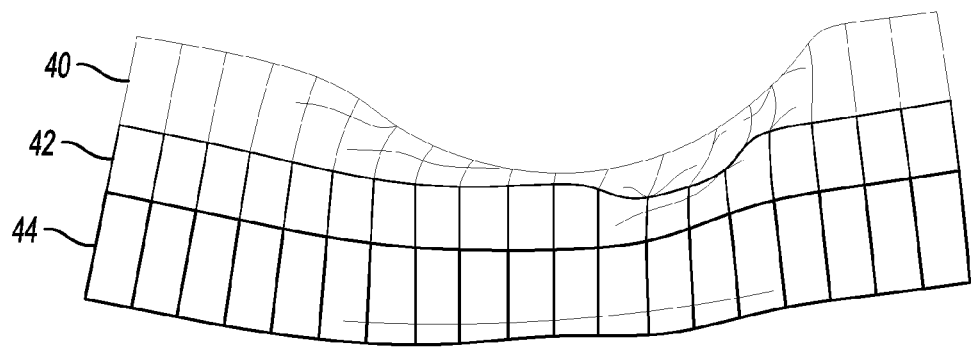

Referring to FIGS. 5A-5C, the progression of the deformation of the stepped honeycomb layers is shown in isolation for better visibility. The honeycomb is made up of the outer portion 40, intermediate portion 42 and inner portion 44 that, for example, may have wall thicknesses of 0.4 mm, 0.5 mm and 0.6 mm. At 0 mm, there is no deformation of the insert comprising the three layers that are housed within the rocker assembly 12 or elongated beam prior to a side impact collision event.

Referring to FIG. 5B at 30 mm after impact, the outer portion 40 of the honeycomb core deforms completely and the intermediate portion 42 of the honeycomb core begins to deform.

Referring to FIG. 5C at 50 mm after impact, the first layer of the honeycomb core is deformed completely and the intermediate layer is partially deformed. The inner portion 44 begins to deform at this point along the core walls. It should be understood that the deformation of the insert including the outer portion 40, intermediate portion 42 and inner portion 44 proceeds progressively. Deformation of the insert absorbs the impact energy and the progressive design reduces acceleration forces applied to the underfloor battery 18.

Figure 6:
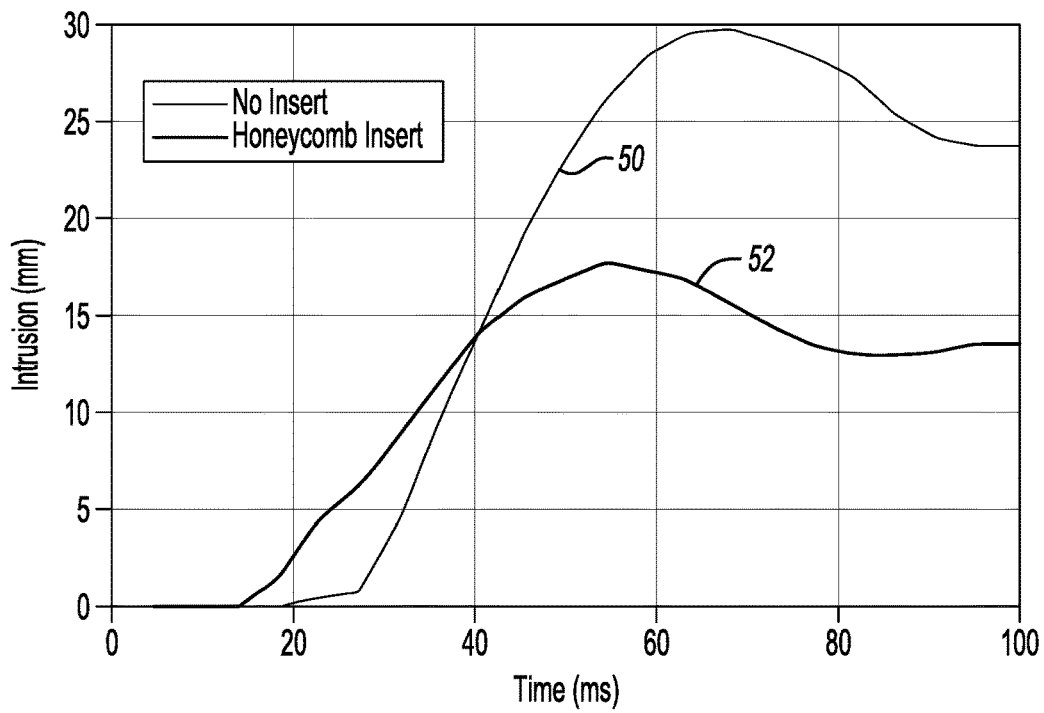
FIG. 6 is a graph comparing the extent of intrusion (mm) over time (ms) for a simulated impact applied to a rocker assembly without an insert to a rocker assembly with an insert.

Referring to FIG. 6, results of a side impact intrusion test (the location of the impact is adjacent to the B-pillar) comparing a baseline rocker assembly to a rocker assembly including a honeycomb insert made according to one embodiment of this disclosure is provided. The baseline rocker assembly has a maximum intrusion of about 30 mm at 68 ms after impact. In comparison, the intrusion with a rocker assembly including the honeycomb insert made according to one embodiment of this disclosure limits intrusion to a maximum intrusion of about 18 mm at about 55 ms after the side impact collision event.

Figure 7:
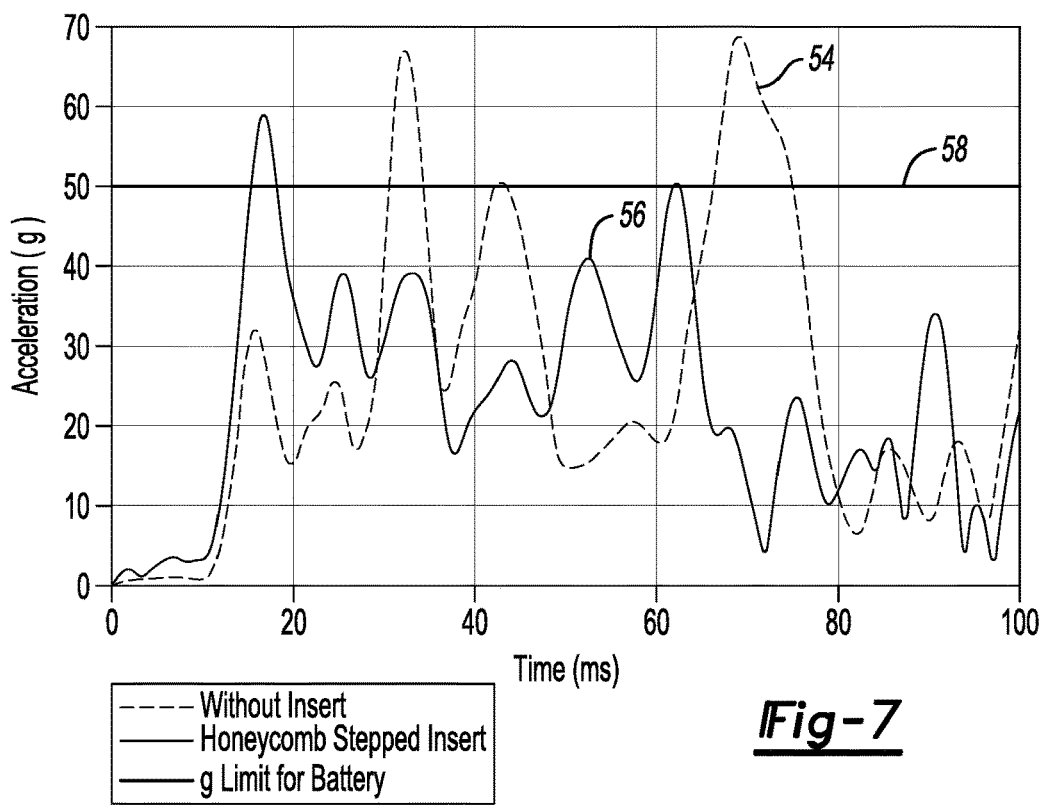
FIG. 7 is a graph comparing battery acceleration (g) over time (ms) for a simulated impact applied to a rocker assembly without an insert to a rocker assembly with an insert.

Referring to FIG. 7, a comparison of battery acceleration caused by a side impact collision event is shown. Acceleration picks are illustrated. Important features of this comparison are that a maximum acceleration and duration of acceleration are compared. The baseline battery acceleration is shown by line 54 and illustrates two acceleration picks that are above the battery acceleration limit shown by line 58. Battery acceleration in a side impact collision as applied to the disclosed honeycomb stepped insert is shown by line 56. Battery acceleration with the insert shows a single pick having a maximum acceleration of about 59 mm per second squared at about 17 ms. This pick is less relevant because it occurs before beginning substantial deformation of the battery pack. With the honeycomb stepped insert, there is a reduced number of acceleration picks. The duration of the pick for a rocker assembly without the insert is greater than the duration of the acceleration picks with the honeycomb insert. One conclusion from this simulation is that resultant peak acceleration is decreased by 12% with the honeycomb insert compared to the baseline.

The stepped honeycomb insert in the rocker assembly is stronger than the rocker assembly without the insert. The rocker assembly deforms progressively when it is provided with a honeycomb insert. With a honeycomb insert in a rocker assembly, approximately 40% less intrusion can be obtained. In addition, reduction in battery acceleration of approximately 17% can be achieved. When the rocker assembly includes the honeycomb rocker insert, the tunnel 14 is more stable and is less subject to buckling. The honeycomb insert also minimizes deformation of the vehicle in a side impact collision. The honeycomb insert is lightweight and may be included within the cavity defined by the rocker outer panel and the side sill without requiring any change in the design of the rocker assembly or vehicle. Because the honeycomb insert is disposed in the cavity, the cost of including the insert is reduced accordingly.

The outer portion 40, intermediate portion 42 and inner portion 44 are assembled utilizing a structural adhesive in one embodiment. In another embodiment, the stepped honeycomb insert may be formed in an extrusion progress, or molding process, that may provide a honeycomb insert with a stepped structure as previously described. The wall thicknesses of the insert may become progressively greater in thickness from the outside of the rocker assembly to the inner side.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A rocker assembly for a vehicle comprising:
   an outer panel and a side sill defining a cavity; and
   an insert including a plurality of layers of reinforcements, each said layer having interconnected walls defining a plurality of transversely extending open cells that define openings having constant cross-section across the layer,
   the openings extending continuously through each said layer of the insert without intervening structure,
   wherein a wall thickness of the insert adjacent the side sill is thicker than a wall thickness of the insert adjacent the outer panel.

2. The rocker assembly of claim 1 wherein the open cells are hexagonal and wherein the plurality of transversely extending open cells are formed by interconnected shared cell walls that define openings extending perpendicularly relative to a length of the rocker assembly.

3. The rocker assembly of claim 2 wherein the insert further comprises a first layer of open cells, a second layer of open cells and a third layer of open cells, wherein the first layer of open cells is directly assembled to the outer panel and the second layer of open cells is directly assembled to the side sill, and the third layer of open cells is disposed between the first and second layers of open cells, wherein the second layer of open cells has a wall thickness that is more than the wall thickness of the third layer of open cells and the third layer of open cells has a wall thickness that is more than the first layer of open cells.

4. The rocker assembly of claim 1 wherein the insert further comprises a first layer of open cells and a second layer of open cells, wherein the first layer of open cells is directly assembled to the outer panel and the second layer of open cells is directly assembled to the side sill, wherein the second layer of open cells has a wall thickness that is more than the wall thickness of the first layer of open cells.

5. A rocker assembly comprising:
   an outer panel;
   a side sill defining a cavity with the outer panel; and
   a reinforcement assembled inside the cavity including a first layer assembled directly to the side sill having a first plurality of walls extending laterally with a thickness $T_1$, and a second layer assembled directly to the outer panel having a second plurality of walls with a thickness $T_2$, wherein $T_1$ is greater than $T_2$, and
   wherein the first and second plurality of walls are laterally aligned and define a plurality of open cells having constant cross-section across each respective layer,
   wherein the open cells extend continuously without intervening structure from the outer panel to the side sill.

6. The rocker assembly of claim 5 wherein the open cells are interconnected hexagonal shaped cells.

7. The rocker assembly of claim 5 wherein the first layer is directly assembled to the outer panel and the second plurality of layers is directly assembled to the side sill, and a third plurality of layers is disposed between the first layer and the second layer, wherein the second layer has a wall thickness that is more than a wall thickness of the third layer and the third layer has a wall thickness that is more than the wall thickness of the first plurality of open cells.

8. The rocker assembly of claim 5 wherein the first and second layers are formed by interconnected shared cell walls that define openings extending perpendicularly relative to a length of the rocker assembly.

* * * * *